United States Patent
Kim

(10) Patent No.: US 7,375,859 B2
(45) Date of Patent: May 20, 2008

(54) METHOD AND APPARATUS FOR CORRECTING SCANNING ERROR IN FLATBED SCANNER

(75) Inventor: Hyun Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1151 days.

(21) Appl. No.: 10/082,360

(22) Filed: Feb. 26, 2002

(65) Prior Publication Data
US 2003/0007197 A1    Jan. 9, 2003

(30) Foreign Application Priority Data
Jul. 6, 2001    (KR)    ................................. 2001-40481

(51) Int. Cl.
*H04N 1/40*    (2006.01)
(52) U.S. Cl. ....................... 358/461; 358/462
(58) Field of Classification Search ................ 358/488, 358/498, 1.12, 1.11, 406, 409, 486, 474, 461, 358/462, 448, 530, 500; 382/274, 287, 276, 382/294; 347/40, 41; 350/208.1
See application file for complete search history.

(56) References Cited

U.S. PATENT DOCUMENTS

| | | | | |
|---|---|---|---|---|
| 5,068,913 A | * | 11/1991 | Sugiura | ........................ 382/175 |
| 5,146,351 A | * | 9/1992 | Maehara | ........................ 358/448 |
| 5,940,192 A | * | 8/1999 | Ichikawa et al. | ............. 358/530 |
| 6,144,467 A | | 11/2000 | Tsai | |
| 6,246,484 B1 | * | 6/2001 | Shimamura et al. | ......... 358/1.12 |
| 6,392,762 B1 | * | 5/2002 | Tsai et al. | ..................... 358/488 |

(Continued)

FOREIGN PATENT DOCUMENTS

JP    62-043965    2/1987

(Continued)

OTHER PUBLICATIONS

"Notification of the Reasons for Objection" issued by Japanese Patent Office dated on Jul. 7, 2003 in corresponding co-pending Japanese patent application 2001-382749.

(Continued)

*Primary Examiner*—Jerome Grant, II
(74) *Attorney, Agent, or Firm*—Robert E. Bushnell, Esq.

(57) ABSTRACT

An apparatus and method for correcting a scanning error in a flatbed scanner, can minimize the scanning error due to deviations in position or scanning of a CCD (charge-coupled device) module by determining a scanning position, a scan region, and a scan rate for each flatbed scanner. The scanning error correcting apparatus includes a white shading plate having a black patch, a reading module for reading the white shading plate and the black patch, and a controller that compares information about the black patch read by the reading module with a predetermined reference value to correct the scanning error in the flatbed scanner. Thus, the apparatus and method can secure a scanning region in horizontal and vertical directions as wide as possible for each flatbed scanner and prevent occurrences of errors in a scanned image due to deviations of the CCD module. Furthermore, the apparatus and method provide an accurately scanned image having a desired scan rate by comparing right and left sizes and the entire scan size for a currently scanned region.

34 Claims, 4 Drawing Sheets

U.S. PATENT DOCUMENTS 6,734,998 B2 * 5/2004 Tsai et al. .................. 358/488

FOREIGN PATENT DOCUMENTS

| JP | 10-160067 | 11/1991 |
| JP | 10-093787 | 4/1998 |
| JP | 10-271283 | 10/1998 |
| JP | 2000-115477 | 4/2000 |

OTHER PUBLICATIONS

"*Notice to Submit Response*" issued by Korean Intellectual Property Office dated on Jul. 30, 2003.

* cited by examiner

METHOD AND APPARATUS FOR CORRECTING SCANNING ERROR IN FLATBED SCANNER

CLAIM OF PRIORITY

This application makes reference to, incorporates the same herein, and claims all benefits accruing under 35 U.S.C. § 119 from my application for METHOD FOR CORRECTING SCANNING ERROR IN THE FLATBED SCANNER AND APPARATUS THEREOF filed with the Korean Industrial Property Office on Jul. 6, 2001 and there duly assigned Serial No. 40481/2001.

BACKGROUND OF THE INVENTION

1. Technical Field

The present invention relates to a flatbed scanner, and more particularly, to a method and apparatus for correcting a scanning error due to a deviation in the position of a charge-coupled device (CCD) module of a flatbed scanner.

2. Description of the Related Art

In a flatbed scanner, a CCD module emits light onto a transparent glass of a flatbed, focuses light reflected from a document that sits on the transparent glass, and reads the image of the document. To accomplish this, upon application of power to the flatbed scanner, the CCD module moves until a home position is detected. If the home position is detected, the CCD module moves to a white shading plate in order to set white shading. Then, if the white shading is set through a white shading plate, the CCD module moves to a scan start line of the transparent glass in order to start an actual scanning operation.

A conventional flatbed scanner moves the CCD module to the home position using a home position sensor provided therein. The flatbed scanner controls other movements of the CCD module, i.e., the movements of the CCD module from the home position to the white shading plate and from the white shading plate to the scan start line, by using values which are pre-computed considering the distances the CCD module is to be moved.

However, since the pre-computed values do not vary depending on the type of flatbed scanner but are determined from a standard flatbed scanner, any deviations in the movement of the CCD module may cause distortions in a resultant image.

For example, if deviations in the position of the CCD module occur such that the scan start line is not detected exactly, Y-registration may occur such that a vertical line, which does not exist in a real image, exists at the top of the scanned image. Furthermore, since a conventional flatbed scanner operates to set the position of a first pixel on a document at a predetermined value, for example, 130 pixels, if an image is scanned such that the first pixel is positioned in front of the predetermined value due to a deviation in the position of the CCD module, the content of the document in front of the predetermined value is shielded by a scan-upper to produce a vertical line that does not exist in the real image on the left portion of the document.

Furthermore, a conventional flatbed scanner does not consider a skew that results when the CCD module is slanted to the right or left, thereby obtaining an unexpected scanned image due to skew of CCD module.

In addition, a conventional flatbed scanner does not consider the right and left magnifications of a scanning image, thereby failing to obtain a scanning image having an accurate scan rate due to a scanning deviation of a CCD module. For example, even if an image having a scan rate of 100% is desired, an image having a scan rate of 105% or 95% may result.

SUMMARY OF THE INVENTION

It is therefore an object of the present invention to provide a method and apparatus for correcting a scanning error in a flatbed scanner, which can reduce a scanning error due to deviations in the position of a CCD module as much as possible by determining a scanning position for each flatbed scanner.

It is another object of the present invention to provide a method and apparatus for correcting a scanning error in a flatbed scanner, which can reduce a scanning error due to deviations in the position of a CCD module as much as possible by securing a scan region as wide as possible in horizontal and vertical directions for each flatbed scanner.

It is still another object of the present invention to provide a method and apparatus for correcting a scanning error in a flatbed scanner, which can reduce a scanning error due to scanning deviations of a CCD module as much as possible by determining a scanning rate for each flatbed scanner.

Accordingly, to achieve the above and other objects, the present invention provides an apparatus for correcting a scanning error in a flatbed scanner. The apparatus preferably includes a white shading plate having one black patch, a reading module for reading the white shading plate and the black patch, and a controller that compares information about the black patch read by the reading module with a predetermined reference value to correct the scanning error in the flatbed scanner.

Preferably, the controller corrects the scanning error by using information about one or more edge lines of the black patch read through the reading module and information about one or more intervals thereof. The controller corrects a scan start line using the result of comparing a predetermined reference value with the number of pixels corresponding to an interval by which the reading module is moved from a top edge line of the black patch through the reading module to a predetermined point.

Preferably, the controller sets a scan region based on the detection of a rightmost edge line of the black patch through the reading module and a position at which a first pixel is read obtained during reading of the white shading plate, thereby correcting a scanning error for the position at which the first pixel is read. Alternatively, the controller may set a scan region based on the detection of the top edge line and a bottom edge line of the black patch read through the reading module and an interval by which the reading module is moved from the top edge line to the bottom edge line. Also, the controller adjusts a scan rate based on predetermined right and left intervals with respect to the center of the black patch read through the reading module.

The present invention also provides a method for correcting a scanning error in a flat scanner in which a white shading plate has one black patch. The method preferably includes detecting one or more information related to the black patch and an interval by which a reading module is moved, based on information obtained by reading the black patch of the white shading plate through the reading module, and correcting the scanning error according to the result of comparing the information detected in the detection with a predetermined reference value.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
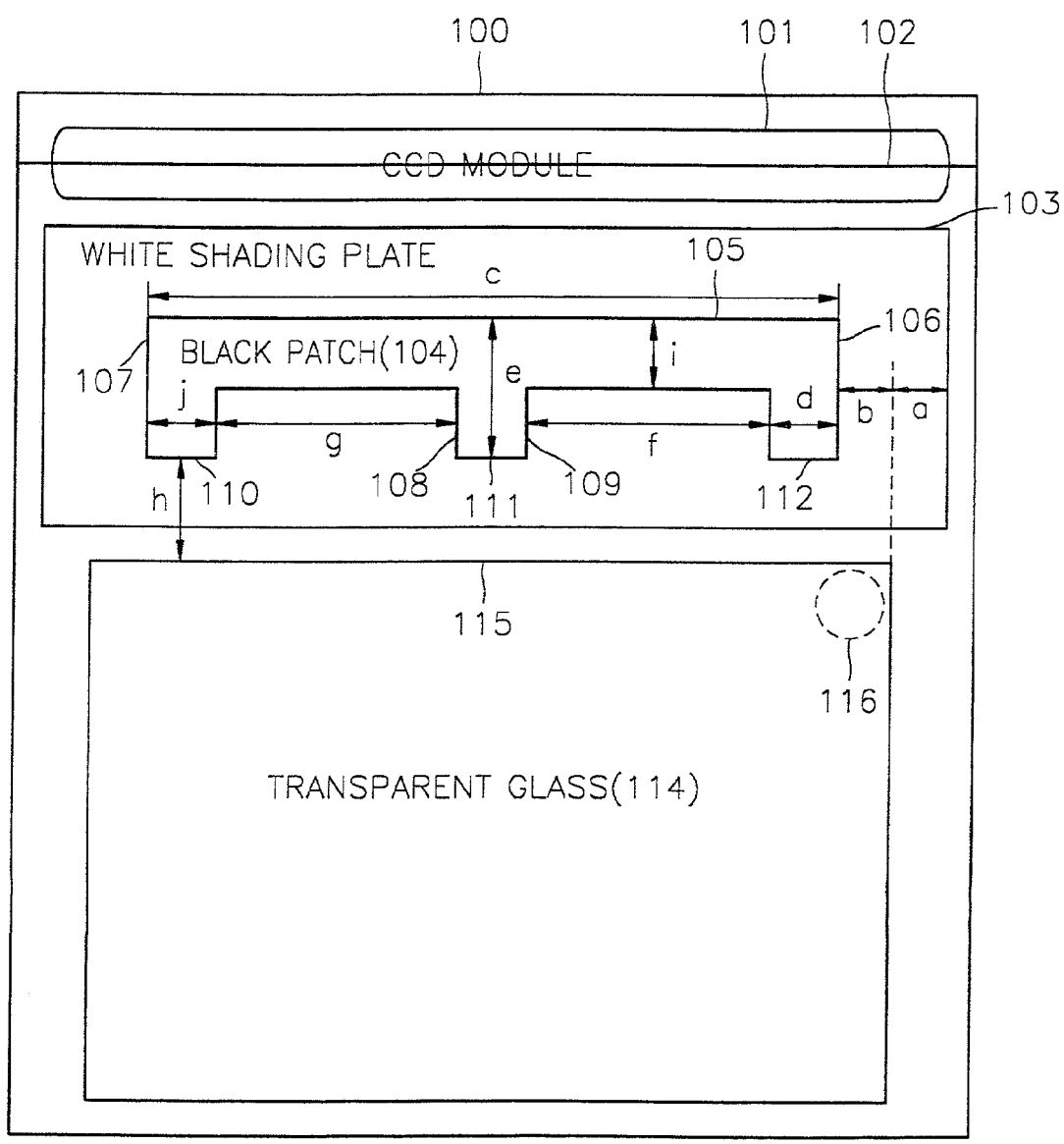
FIG. 1 is a conceptual view showing the operation of a flatbed scanner for explaining a method for correcting a scanning error according to the present invention.

Turning now to the drawings, referring to FIG. 1, a flatbed scanner 100 includes a charge-coupled device (CCD) module 101, a white shading plate 103 having one black patch 104 according to the present invention, and a transparent glass 114. The black patch 104 has the shape of a character "E" slanted downward at an angle of 90°. It is possible to form a black patch having a shape similar to that of the black patch 104 in the white shading plate 103. That is, any pattern that can be divided by its center into two equal patterns may be used as the black patch 104 of the white shading plate 103.

Before or after white shading through the white shading plate 103, a scan position and a scan region are determined by detecting edge lines 105, 106, 107, 108, 109, 110, 111, and 112 of the black patch 104 and the number of pixels in particular intervals a, b, c, d, e, f, g, h, i, and j of the black patch 104. Furthermore, the right and left magnifications of a scanned image is corrected by considering the number of pixels in the intervals f and g, or d, f, g, and j. Here, the magnification refers to a scan rate of a document.

A scan start line 115 is included on the transparent glass 114, and reference numeral 116 denotes a region at which a first pixel exists.

Figure 2:
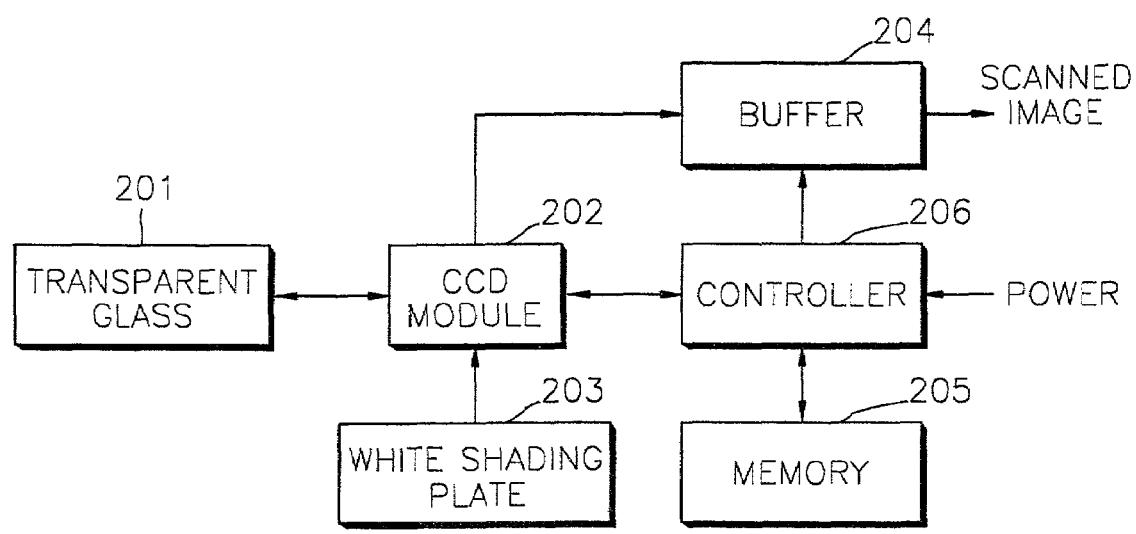
FIG. 2 is a block diagram of an apparatus for correcting a scanning error in a flatbed scanner according to the present invention.

FIG. 2 is a block diagram of an apparatus for correcting a scanning error due to position or scanning deviation of a CCD module using a black patch of a white shading plate in a flatbed scanner as described above. Referring to FIG. 2, the scanning error correcting apparatus according to the present invention includes a transparent glass 201, a charge-coupled device (CCD) module 202, a white shading plate 203, a buffer 204, a memory 205, and a controller 206.

The transparent glass 201 is provided on a flatbed of the flatbed scanner for placing a document to be scanned. The CCD module 202, which is a reading module for reading an image, is configured in the same manner as a CCD module of a conventional flatbed scanner. The white shading plate 203 is used for setting a white reference level. Although the white shading plate 203 is configured in a way akin to that of a conventional flatbed scanner, the difference is that the white shading plate 203 in the present invention includes the black patch 104 having the shape shown in FIG. 1. Thus, when reading an image from the white shading plate, the CCD module 202 performs a scanning error correction according to the present invention using the result of the particular intervals of the black patch 104 detected by the CCD module 202.

The buffer 204 stores an image read by the CCD module 202 from the document that sits on the transparent glass 201. The memory 205 stores reference values required for scanning error correction according to the present invention. That is, the memory 205 stores condition information about edge lines and the particular intervals of the black patch 104, which will be required when correcting a scanning error. The condition information stored in the memory 205 is read by the controller 206. The condition information may also be stored in the controller 206. The controller 206 compares the condition information stored in the memory 205 with information about the edge lines and the particular intervals of the black patch 104 of the white shading plate 203 detected through the CCD module 202, and determines a scanning region and a scanning position, thereby correcting a scanning error resulting from deviations in the position or scanning of the CCD module 202. The operation of the controller 206 for correcting a scanning error will be described below in greater detail with reference to FIG. 4.

Figure 3:
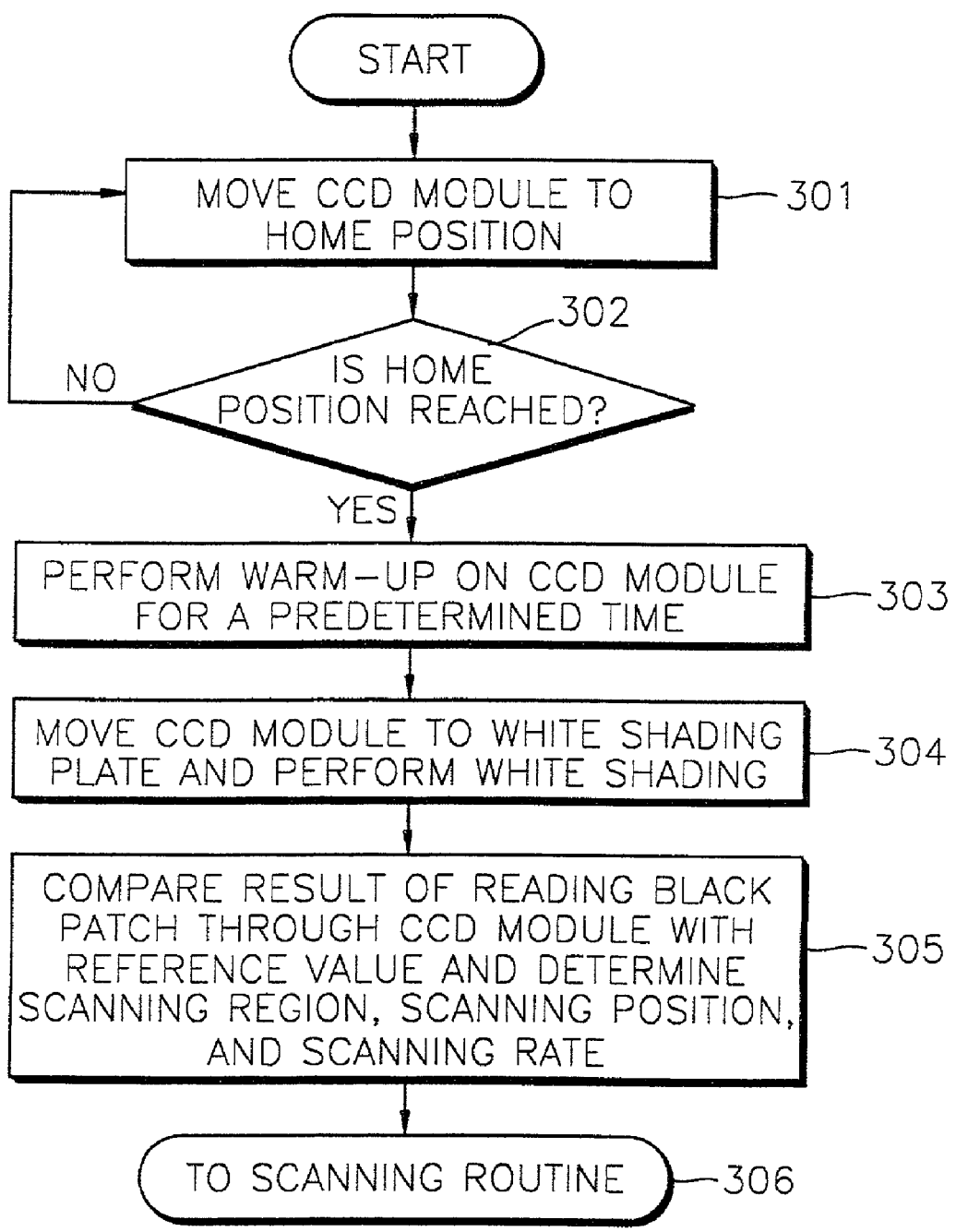
FIG. 3 is a flowchart of a method for correcting a scanning error in a flatbed scanner according to the present invention.

FIG. 3 is a flowchart showing scanning error correction method according to the present invention. The flowchart of FIG. 3 will now be described with reference to the apparatus of FIG. 2.

When power is applied to the flatbed scanner, the controller 206 instructs the CCD module 202 to move to a home position 102 in step 301. If it is determined that the CCD module 202 reaches the home position in step 302, the CCD module 202 performs a warm-up for a predetermined time in step 303. The way of determining whether the CCD module 202 reaches the home position 102 is the same as that of a conventional flatbed scanner.

If the warm-up of the CCD module 202 is completed, in step 304, the controller 206 moves the CCD module 202 to the white shading plate 203 and performs white shading in the same manner as in a conventional flatbed scanner. In step 305, the controller 206 compares the results of reading the black patch 104 of the white shading plate 203 through the CCD module 202 with the reference values stored in the memory 205 and determines a scanning region, a scanning position, and a scanning rate for the transparent glass 201. Thus, a scanning error resulting from deviations in position or scanning of the CCD module 202 is corrected. The operation shown in step 305 will be described below in greater detail with reference to FIG. 4. In step 306, a routine for performing actual scanning through the transparent glass 202 based on the scanning region and scanning position is executed.

Although it has been shown in FIG. 3 that the scanning region, the scanning position, and the scanning rate are determined through the black patch 104 after white shading, white shading may be performed after determining the scanning region, the scanning position, and the scanning rate through the black patch 104.

Figure 4:
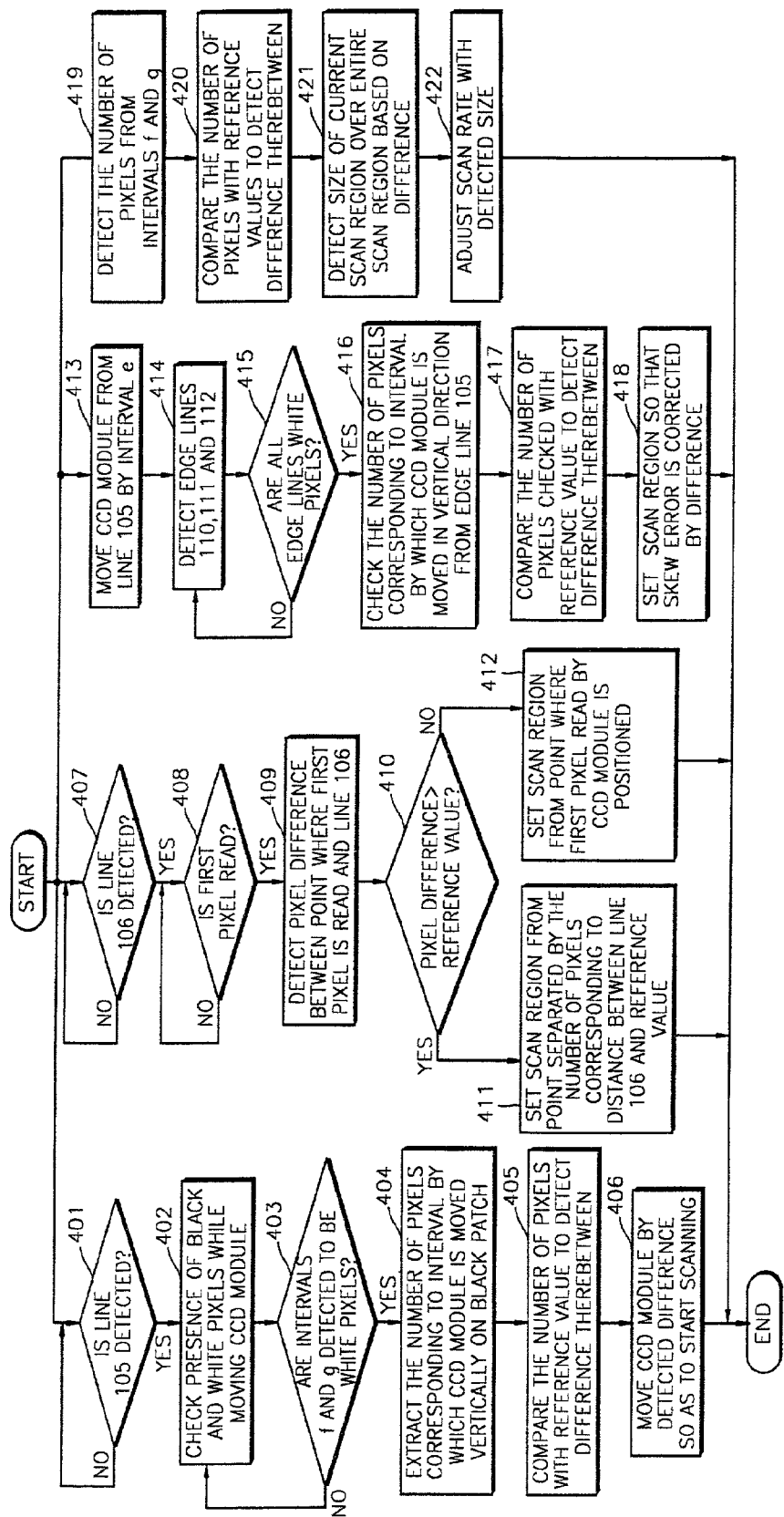
FIG. 4 is a detailed flowchart of a method for correcting a scanning error in a flatbed scanner according to the present invention.

FIG. 4 is a detailed flowchart of a method for correcting a scanning error due to deviations in the position or scanning of the CCD module 202 by comparing the result of reading the black patch 104 of the white shading plate 203 through the CCD module 202 with reference values stored in the memory 205. In particular, FIG. 4 shows methods for correcting an error for the first pixel at the region 116 of FIG. 1 and a skew and a magnification error of the CCD module 202.

Steps 401-406 of the flowchart are steps of a process for correcting a scan start line. In step 401, when the CCD module 202 reads an image from the white shading plate 203, the controller 206 checks whether the edge line 105 of the black patch 104 is detected. The edge line 105 is a top edge line of the black patch 104. The edge line 105 is the first line in which a black pixel is detected as a result of reading the image from the white shading plate 203 through the CCD module 202.

If the edge line 105 has been detected, in step 402, the controller 206 checks the presence of black and white pixels in the white shading plate 203 through binary data output from the CCD module 202 while moving the CCD module 202. If the intervals 'f' and 'g' of the black patch 104 are all detected to be white pixels in step 403, in step 404, the controller 206 extracts the number of pixels corresponding to an interval by which the CCD module is moved vertically from the point at which the edge line 105 is detected to the point at which both intervals 'f' and 'g' are detected to white pixels. If the intervals 'f' and 'g' of the black patch 104 are not detected in step 403, the controller 206 returns the process to step 402.

In step 405, the controller 206 compares the number of pixels extracted with a reference value to detect a difference between the number of pixels extracted and the reference value. The reference value, which is stored the memory 205, is the number of pixels corresponding to the intervals 'e' and 'h' of FIG. 1, that is, an interval e+h. In step 406, the controller 206 moves the CCD module 202 by an amount corresponding to the detected difference so as to start scanning. For example, if the number of pixels corresponding to the interval e+h is 216 pixel, the controller 206 moves the CCD module 202 by the number of pixels obtained as a result of subtracting from 216 the number of pixels corresponding to the distance by which the CCD module 202 is moved vertically to the point at which the intervals 'f' and 'g' are detected, thereby correcting a scan start As described in steps 401-406, the scan start line is corrected by using the distance by which the CCD module 202 is moved vertically from the point at which the edge line 105 is detected to the point at which the intervals 'f' and 'g' are detected. However, the scan start line may be corrected by a vertical movement distance of the CCD module 202 from the point where the edge line 105 is detected to the point where the edge lines 110, 111, and 112 are detected.

Steps 407-412 of the flowchart are steps of a process for correcting a first pixel. In step 407, while the CCD module 202 reads an image from the white shading plate 203, the controller 206 checks through binary data output from the CCD module 202 whether the edge line 106 of the black patch 104 is detected. The edge line 106 is the rightmost edge line of the black patch 104.

If the edge line 106 is detected in step 407, in step 408, the controller 206 checks whether a first pixel is read while reading of the white shading plate 203 is performed. If the first pixel has been read, in step 409, the controller 206 detects the number of pixels corresponding to a difference between a position where the first pixel has been read and the point where the edge line 106 has been detected.

In step 410, the controller 206 compares the number of pixels detected with a reference value. The reference value is the number of pixels corresponding to the interval 'b' of FIG. 1. That is, the reference value is the number of pixels corresponding to an interval from the edge line 106 to the point set by the interval 'b'. If the number of pixels detected is greater than the reference value as a result of comparison, the position where the first pixel is read exists in the interval 'a' of FIG. 1, and a black line may be produced in a vertical direction on a scanned image due to a scan-upper. Thus, the controller 206 sets a scan region such that the first pixel is read at a point separated from the line 106 by the number of pixels corresponding to the reference value.

Conversely, if the reference is greater than the number of pixels detected, the position where the first pixel is read exists in the interval 'b' of FIG. 1. Thus, in step 412, the controller 206 sets a scan region from a point at which the first pixel read by the CCD module 202 is positioned.

For example, if the reference value is 192 pixels, the position of the read first pixel is greater than 192 pixel, in step 411, the controller 206 sets a scan region beginning with a point (the point including the entire interval 'b' of FIG. 1) separated to the right in a horizontal direction from the edge line 106 by 192 pixels. However, if the position of the read first pixel is not greater than 192 pixels (if the position is within the interval 'b' of FIG. 1), in step 412, the scan region is set from the point where the first pixel is read.

By performing steps 407-412 in this way, the flatbed scanner sets a scan region in which an error for a first pixel has been corrected.

Steps 413-418 of the flowchart are steps of a process for correcting a skew. In step 413, when the CCD module 202 reads an image from the white shading plate 203, the controller 206 makes the CCD module 202 move in a vertical direction from the edge line 105 by a distance corresponding to the interval 'e'. In step 414, the controller 206 detects the edge lines 110, 111, and 112 of the black patch 104 through binary data transmitted from the CCD module 202. The edge lines 110, 111, and 112 are bottom edge lines of the black patch. The bottom edge lines 110, 111, and 112 are detected in the same manner as described above by checking whether black or white pixels are read by the CCD module 202.

In step 415, the controller 206 checks whether all of the edge lines 110, 111, and 112 are white pixels through the binary data transmitted from the CCD module 202. If all of the edge lines 110, 111, and 112 are white pixels, in step 416, the controller 206 checks the number of pixels corresponding to an interval by which the CCD module 202 is moved in a vertical direction from the edge line 105. In step 417, the controller 206 compares the number of pixels checked with a reference value to detect a difference between the numbers of pixels checked and the reference value. The reference value, which is stored in the memory 205, is the number of pixels corresponding to the interval 'e' of FIG. 1. In step 418, if the difference is detected, the controller 206 sets a scan region such that the skew is corrected using the detected difference.

That is, if the skew is zero, white pixels are detected in all of the edge lines 110, 111, and 112. However, if the skew occurs, a black pixel maybe detected in the edge lines 110 and 111 and a white pixel may be detected in the edge line 112 or vice versa. Alternatively, a black pixel may be detected in the edge line 110 and a white pixel may be detected in the edge lines 111 and 112. If the skew occurs in this way, a white pixel is not simultaneously detected in all of the edge lines 110, 111, and 112.

Thus, if the skew does not exist, since a point at which a white pixel is detected in all of the edge lines 110, 111, and 112 is a point having the number of pixels corresponding to the reference value used in step 417, the difference detected in step 417 is 'zero', and thus it is unnecessary to set a scan region considering a skew in step 418.

However, if a skew exists, a point at which a white pixel is detected in all of the edge lines 110, 111, and 112 is a point having the number of pixels which is greater than the reference value used in step 417. Thus, the difference is detected in step 417. For example, if the number of pixels corresponding to a distance by which the CCD module 202 is moved in a vertical direction to the point at which the edge lines 110, 111, and 112 are all white pixels is 168 and the number of pixels corresponding to the interval 'e' is 144, the difference detected in step 417 is 24 pixels. Thus, the controller 206 needs to set a scan region such that the skew corresponding to 24 pixels is corrected.

In order to correct a skew, if the detected difference is 24 pixels, a scan region is set by detecting right and left skew range with respect to the center of the black patch 104 using 12 which is obtained by dividing 24 by 2 (24/2). That is, 12 pixels correspond to a right and left skew range of 0.5 mm since 24 pixels are allocated per 1 mm. Thus, the controller 206 sets a scan region so that a scan start line is moved by 7 mm (6 mm+0.5 mm×2), thereby correcting a skew.

Steps 419-422 of the flowchart are steps of a process for adjusting a scan rate so that a magnification error of the flatbed scanner is corrected. In step 419, when the CCD module 202 reads an image from the white shading plate 203, the controller 206 detects the number of pixels from the intervals 'f' and 'g' of FIG. 1. In step 420, the controller compares the number of pixels of the interval 'f' and the number of pixels of the interval 'g' detected in step 419 with corresponding reference values and detects differences between the number of pixels of the interval 'f' and the number of pixels of the interval 'g' detected in step 419 with corresponding reference values. The reference values corresponding to the number of pixels in the intervals 'f' and 'g' are preset for the intervals 'f' and 'g' and stored in the memory 205. In step 421, the size of a current scan region over the entire scan region is detected based on the detected differences. For example, if the number of pixels in the interval 'f' is 2064, and its reference value stored in the memory 205 is 2040, and if the number of pixels in the interval 'g' is 2064 and its reference value is 2040, additional 24 pixels are read to the right and left of the scan region. Thus, if an interval of 170 mm (millimeters) is obtained by subtracting the widths of the edge lines 110, 111, and 112 from the interval 'c' of FIG. 1 in the entire scan region, the scan region is read by an additional 2 mm. This is because 24 pixels are allocated per 1 mm and 24 pixels are read further in each of the intervals 'f' and 'g'. Therefore, if the entire scan region is 216 mm and each of the intervals 'f' and 'g' are recognized as 86 mm, the scan region is read by an additional 2.54 mm (=216×((86/85)−1)). Using 2.54 mm and the size (216 mm) of entire scan region, the size of a current scan region is detected to be 101% (=(216+2.54)/216).

In step 422, if the size of the current scan region is detected, the controller 206 adjusts a scan rate using the detected scan size. That is, as shown in step 421, 101% scanning is performed when the scan rate is 100%. Thus, a 100% scanned image can be obtained by changing the scan rate to about 99% (=(100/101)×100).

Although the above magnification error correction has been made by using pixels in the intervals 'f' and 'g' of FIG. 1, this correction may be made by further considering the intervals 'j' ii and 'd' of FIG. 1. In order to further consider the intervals 'j' and 'd', the controller 206 uses information about the edge lines 107 and 106, which are lines furthest to the left and right, respectively. The right and left intervals of the black patch 104 are considered in this way to determine the right and left edges of the scan region.

FIG. 4 shows the correction processes performed in parallel based on binary data transmitted from the CCD module 202. Alternatively, all edge lines and the number of pixels in all intervals thereof required for the above correction based on the binary data transmitted through the CCD module 202 are firstly detected, and then corresponding reference values stored in the memory 205 are compared with information about the detected black patch 104 in order to obtain the correction result in a specified order. A scan region, a scan position, and a scan rate are then determined based on the obtained correction result to control the operation of the CCD module 202 or the output range of a scanned image stored in the buffer 204.

As described above, according to the present invention, one black patch is provided in a white shading plate of a flatbed scanner, the correction of a corresponding scanning error is determined by detecting each edge line of black patch and the number of pixels in each interval thereof and comparing the detected values with corresponding reference values, and a scanning region, a scanning position, and a scan rate are determined for each flatbed scanner. Thus, the present invention can secure a scanning region in horizontal and vertical directions as wide as possible for each flatbed scanner and prevents occurrences of error in a scanned image due to position deviations in a CCD module. Furthermore, the present invention provides a scanned image accurately having a desired scan rate by comparing right and left sizes and the entire scan size for a currently scanned region detected by the black patch.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. An apparatus for to correct positional scanning errors in a flatbed scanner, the apparatus comprising:
   a white shading plate having a black patch;
   a reading module accommodating reading of positional information of said white shading plate and said black patch; and
   a controller comparing positional information of said black patch read by said reading module with a predetermined reference value to correct the positional scanning errors in the flatbed scanner.

2. The apparatus of claim 1, wherein the information of said black patch comprises at least one of information of the edge lines of said black patch read through said reading module and information of a plurality of intervals of said black patch, and the predetermined reference value includes a plurality of values.

3. The apparatus of claim 1, further comprised of said controller correcting a scan start line using the result of comparing a predetermined reference value with a number of pixels corresponding to an interval by which said reading module is moved from a top edge line of said black patch read through said reading module to a predetermined point.

4. The apparatus of claim 3, further comprised of the predetermined reference value being a number of pixels corresponding to a distance from the top edge line of said black patch to the scan start line.

5. The apparatus of claim 1, further comprised of said controller setting a scan region based on the detection of a rightmost edge line of said black patch through said reading module and a position of a first pixel being read obtained during reading of said white shading plate to correct a scanning error for the position of the first pixel being read.

6. The apparatus of claim 5, further comprised of said controller setting a scan region accommodating when the read position of the first pixel read through said reading module is beyond a point set by a predetermined reference value, the point set by the predetermined reference value being the point where the first pixel is read, and
said controller setting a scan region accommodating when the read position of the first pixel is within the point set by the predetermined reference value, the first pixel can be read at the position where the first pixel is read.

7. The apparatus of claim 1, further comprised of said controller setting a scan region based on the detection of the top edge line and a bottom edge line of said black patch read through said reading module and an interval by which the reading module is moved from the top edge line to the bottom edge line.

8. The apparatus of claim 7, further comprised of said controller setting the scan region accommodating a skew of said reading module being corrected by comparing the interval by which said reading module is moved with a predetermined reference value.

9. The apparatus of claim 1, further comprised of said controller adjusting a scan rate based on predetermined right and left intervals with respect to the center of said black patch read through said reading module.

10. The apparatus of claim 9, further comprised of said controller detecting the size of a region scanned by said reading module over the entire scan region based on a difference detected by comparing the predetermined right and left intervals with a predetermined reference value to adjust the scan rate.

11. The apparatus of claim 1, with the predetermined reference value being set based on a pattern of said black patch.

12. The apparatus of claim 1, further comprising a memory for storing the predetermined reference value.

13. The apparatus of claim 1, further comprising a transparent glass on which a document is placed; and
a buffer storing an image read through said reading module,
with the controller controlling the output of the image stored in the buffer to correct the scanning error.

14. The apparatus of claim 1, further comprised of said black patch including a center dividing said black patch into two equal patterns, said black patch being symmetric about the center line.

15. A method of correcting positional scanning errors in a flatbed scanner with a white shading plate including a black patch, the method comprising:
detecting positional information related to said black patch and an interval moved by a reading module, based on positional information obtained by reading said black patch using said reading module; and
correcting the positional scanning errors according to the result of comparing the detected positional information related to said black patch with a predetermined reference value.

16. The method of claim 15, wherein the detected information related to said black patch comprises at least one of information of edge lines of said black patch and information of intervals, and the predetermined reference value includes a plurality of values.

17. The method of claim 15, further comprised of when an interval moved by said reading module on said black patch in a vertical direction after detecting a top edge line of said black patch is detected, the scanning error is corrected based on a difference detected by comparing the interval with the predetermined reference value.

18. The method of claim 17, further comprising a scanning start line being corrected based on the detected difference.

19. The method of claim 15, further comprised of when a position at which a first pixel is read is detected while reading said white shading plate after detecting a rightmost edge line of said black patch, the scanning error is corrected by setting a scan region according to the result of comparing the position at which the first pixel is read with a predetermined reference value during the correction of the scanning error.

20. The method of claim 15, further comprised of when an interval by which the reading module is moved from a top edge line of said black patch to a bottom edge line of said black patch is detected, a scan region is set based on the result of comparing the interval by which the reading module is moved with the predetermined reference value.

21. The method of claim 15, further comprised of when predetermined right and left intervals with respect to the center of said black patch are detected, a scan rate is adjusted based on the result of comparing each of the detected predetermined intervals with a corresponding predetermined value.

22. A method, comprising:
detecting positional information with respect to a pattern of a black patch on a white shading plate included in a scanning apparatus; and
comparing the detected positional information of the pattern of said black patch with a respective predetermined reference value to correct positional scanning errors, the respective reference value being set according to the pattern of said black patch.

23. The method of claim 22, with the detecting information of said black patch further comprising of detecting of edge lines of said black patch.

24. The method of claim 22, with the detecting information of said black patch further comprising of checking the presence of black and white pixels while moving a reading module of said scanning apparatus.

25. The method of claim 22, with the detecting information of said black patch further comprising of checking whether an interval of said white shading plate between a first edge of said black patch and a second edge of said black patch is detected to have white pixels.

26. The method of claim 25, with the information further comprising of extracting the number of pixels corresponding to an interval said reading module is moved vertically on said black patch.

27. The method of claim 26, with the step of comparing the information detected of said black patch with a respective predetermined reference value to correct scanning errors, further comprising of comparing the number of pixels corresponding to the interval said reading module is moved vertically on said black patch with the respective predetermined reference value being the number of pixels a reader moves vertically from a top edge of said black patch to the top edge of a transparent glass of the said scanner.

28. The method of claim 23, further comprising:
detecting a first pixel being read while reading of said white shading plate; and
detecting a pixel difference between where the first pixel is read and the point where the edge line has been detected.

29. The method of claim 28, further comprising:
comparing the difference between where the first pixel is read and the point where the edge line has been detected to the respective predetermined reference value;
setting a scan region according to the distance between the edge line and the respective predetermined reference value when the pixel difference is greater than the respective predetermined reference value; and
setting the scan region from the point where the first pixel is read when the respective predetermined reference value is greater than the pixel difference.

30. The method of claim 29, with the respective predetermined reference value of the information of the first pixel read and the point where the edge line has been detected being a distance from the rightmost edge of said black patch and rightmost edge of said transparent glass.

31. The method of claim 23, with the step of detecting information of said black patch further comprising of checking the number of pixels corresponding to an interval the reading module is moved in the vertical direction from the edge line when all edge lines are white pixels.

32. The method of claim 31, with the step of comparing the information further comprising:
comparing of the number of pixels checked with the respective predetermined reference value; and
setting a scan region to correct skew error according to the comparing of the number of pixels checked with the predetermined reference value.

33. The method of claim 32, with the respective predetermined reference value for correcting the skew error being a certain distance of a region of the pattern of said black patch.

34. The method of claim 22, further comprising adjusting a scan rate according to the comparison of the information detected of said black patch with the respective predetermined reference value.

* * * * *